C. B. CHATFIELD.
AUTOMOBILE SEATING.
APPLICATION FILED JULY 17, 1916.
1,222,360.
Patented Apr. 10, 1917.
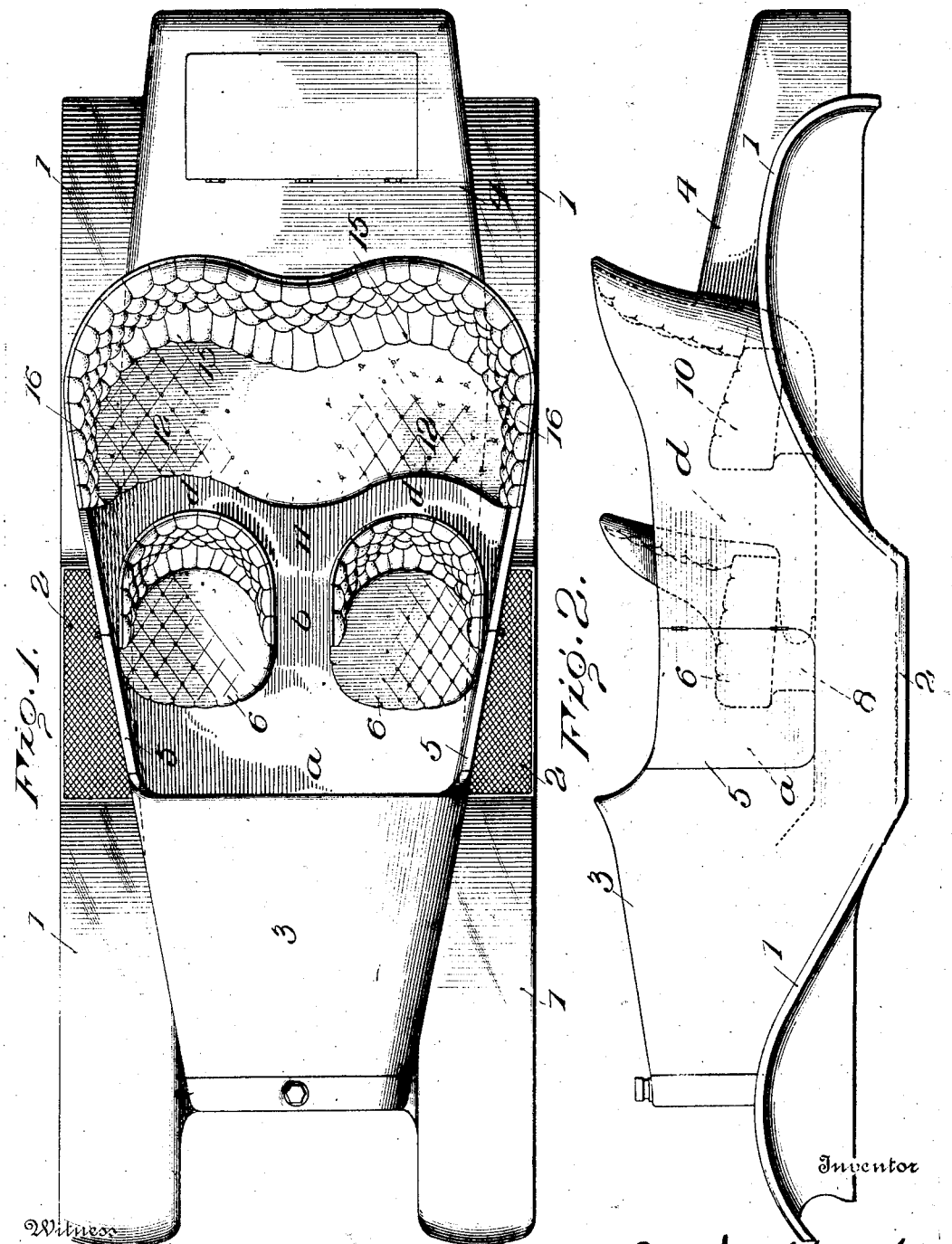

UNITED STATES PATENT OFFICE.

CHARLES B. CHATFIELD, OF GRAND RAPIDS, MICHIGAN.

AUTOMOBILE-SEATING.

1,222,360.  Specification of Letters Patent.  Patented Apr. 10, 1917.

Application filed July 17, 1916. Serial No. 109,683.

*To all whom it may concern:*

Be it known that I, CHARLES B. CHATFIELD, a citizen of the United States, and resident of Grand Rapids, county of Kent, and State of Michigan, have invented certain new and useful Improvements in and Relating to Automobile-Seating, of which the following is a specification.

This invention relates to improvements in automobile seating; and the objects and nature of the invention will be readily understood by those skilled in the art in the light of the following explanation of the accompanying drawings illustrating what I now believe to be the preferred embodiment and mechanical expression of my invention from among other formations and arrangements within the spirit and scope of the invention.

My invention is characterized by the provision of a continuous rear divan seat so arranged in an automobile body (whether or not of the closed or open type) having a pair of separated front seats, as to be capable of comfortably seating three adults of average size in "chummy" or family relation and easy conversational range and with ample leg, shoulder and elbow room, with respect to each other and the two persons located in the front seats, and by such seating having capacity for five persons comfortably arranged within automobile body limits to permit the utilization of the rear portion of the body for storage purposes.

An object of the invention is to provide automobile seating having the hereinbefore mentioned characteristics.

A further object of the invention is to provide an automobile body capable of comfortably seating five persons and embodying a continuous or divan rear seat having its front seat line approximately of a continuous compound curvature bulging or convexed forwardly at its central portion and concaved rearwardly at its end portions and with its back bulged forwardly at its central portion and curving in opposite directions therefrom to form curved end depressions and outwardly flaring sides so that the persons occupying the end portions of the divan seat can face forwardly and inwardly at an angle with respect to the straight ahead position of the person occupying the central portion of said seat.

The invention consists in certain features in construction and arrangement and in combinations as more fully and particularly set forth hereinafter.

Referring to the accompanying drawings:—

Figure 1, is a top plan view of an automobile body embodying my invention.

Fig. 2, is a side elevation thereof, dotted lines indicating certain hidden parts.

In the particular example illustrated, I show front and rear wheel fenders 1, running boards 2, and front hood 3, in connection with an automobile body of the roadster type having its rear portion 4 providing a storage locker of substantial capacity.

The passenger space of this body is arranged at the central portion thereof approximately midway the length of the body. Entrance to and exit from this passenger space is gained through any suitable front side doors 5, and although I prefer to provide these doors at both sides of the body yet but one door can be employed or provided if preferred.

Within said passenger space, and just in rear of the doors, I provide a pair of approximately similar chairs or seats 6 one of which is properly arranged for occupation by the driver of the car. Each seat 6 is designed to comfortably receive one person and the two seats 6 are spaced the necessary distance apart to provide a passageway or aisle $b$ extending longitudinally and centrally of the body from the space $a$ in front of seats 6 to the space $d$ in rear of said seats. The two seats 6 are arranged in line or side by side transversely of the body and are preferably spaced such a distance apart as to provide sufficient width for the aisle $b$ to permit movement of passengers along the floor of the body between said seats from space $a$ to space $d$. The seats 6 are usually mounted on vertical pedestals 8 fixed to the floor of the body, and if so desired, one (or both) of said seats can be so mounted on its pedestal as to rotate on a vertical axis to permit partial rotation of the seat to increase the width of the aisle $b$ or to permit the occupant of said seat to assume a position at an angle to the front or forwardly facing position.

The pedestals on which these seats are mounted, are preferably of such diameter or transverse dimensions as to provide leg and foot room on the floor beneath the seats.

The portion of the passenger space within the body located in rear of the chairs or seats 6 is almost entirely occupied by a continuous or divan rear seat 10 extending completely across the body and having a continuous front longitudinal edge or seat line of a compound curvature divided into three approximately equal portions or divisions, to wit; a central forward bulge or convexity 11 immediately in rear of the center longitudinal aisle b, and two similar end rearward bulges or concavities 12 immediately behind the chairs 6, respectively. The concavities merge into the convexity to form the continuously curved front seat line of a length approximately equal to three times the length of the front line of a seat for one person, for instance, the front line of one of the seats 6.

The convex part 11 forms the front line of a more or less undefined portion of the unbroken or continuous seat of the divan of sufficient area to comfortably seat a person of average size, and the same is true of each concave part 12.

The divan is provided with an upwardly and rearwardly inclined continuous or unbroken back which bulges forwardly at its central portion 14 in rear of the convex part 11 of the front line of the divan seat, and which bulges or concaves rearwardly at its end portions 15 in rear of the concavities 12 of the seat front line, so that the divan back is formed with concavities that merge on curved-lines into a central convexity to approximately correspond to the curvatures of the front line of the divan seat and to maintain the divan seat throughout its length of approximately uniform width from front line to back.

The back is continued forwardly at the sides of the automobile body approximately to the front ends of the front line of the seat to form back ends 16 at the opposite ends of the divan seat. These ends flare or incline upwardly and outwardly and gradually merge rearwardly and inwardly on curved lines into the back concavities 15 so that the opposite portions of the back are somewhat rounded and bulged outwardly to enable the occupants thereof to face slightly inwardly and forwardly with their shoulders out of direct alinement transversely of the automobile body and consequently out of alinement with the shoulders of the person occupying the center of the divan and facing forwardly.

The person occupying the center of the divan occupies a position slightly in advance of the persons occupying the concavities or end portions of the divan and is directly behind the aisle b and finds ample leg and foot room in said aisle. In fact, the knees and lower limbs of this advanced centrally arranged occupant will be located approximately between the chairs 6 and in said aisle. The occupants of the concaved portions of the divans are afforded ample foot and lower leg room below the seats of the chairs 6, because of the reduced pedestals supporting said chairs, although the parts 12 of the divan seat line more or less closely approach the backs of the chairs 6 yet are spaced therefrom a sufficient distance to afford the necessary knee room.

What I claim is:—

1. A vehicle body of the "chummy" type, having front chairs with a central longitudinal intervening aisle, and a rear divan extending transversely across the body closely behind the chairs and having a continuous seat and back bulged forwardly behind said aisle to provide an advanced center seating portion for one person and arranged rearwardly behind said chairs to provide rearward end seating portions for two persons, substantially as described.

2. A vehicle body having "chummy" seating capacity for five persons and provided with a pair of alined front chairs mounted on reduced pedestals, and a continuous-seat rear divan extending transversely across the body immediately in rear of said chairs and bulged forwardly at its central portion and rearwardly at its end portions.

3. An automobile body having a divan to seat three persons extending transversely across the body and formed with a continuous seat having a front seat line concaved at its end portions and convexed at its central portion and forming a continuous compound curve and a continuous back having forwardly extending flaring ends, and concavities and a convexity corresponding approximately to the concavities and convexity of said front line of the seat, substantially as described.

4. An automobile body of the "chummy" type having a front side door, a pair of front chairs with an intervening longitudinal aisle for passage of passengers to the space behind said chairs, and a divan extending transversely across the body behind said chairs and having a continuous seat and corresponding back, both back and seat being bulged forwardly at the center to support a passenger in an advanced central position with foot and leg room in said aisle, said divan being formed to support passengers behind said chairs, respectively, with foot and lower limb room below the same and with their shoulders out of alinement with the shoulders of said centrally arranged passenger.

5. An automobile having a divan extending transversely across the body and convexed forwardly at the central portions of its back and seat and concaved rearwardly at the opposite end portions of its back and seat with the ends of the back curving forwardly at the ends of the seat, said back being continuous throughout its length with said central convexity merging into said concavities, said seat being continuous, with a continuous front seat line having the central convexity merging into said end concavities, whereby a central advanced position is provided for one passenger and rearward forwardly and inwardly facing positions are provided for two passengers, substantially as described.

CHAS. B. CHATFIELD.